Patented June 12, 1923.

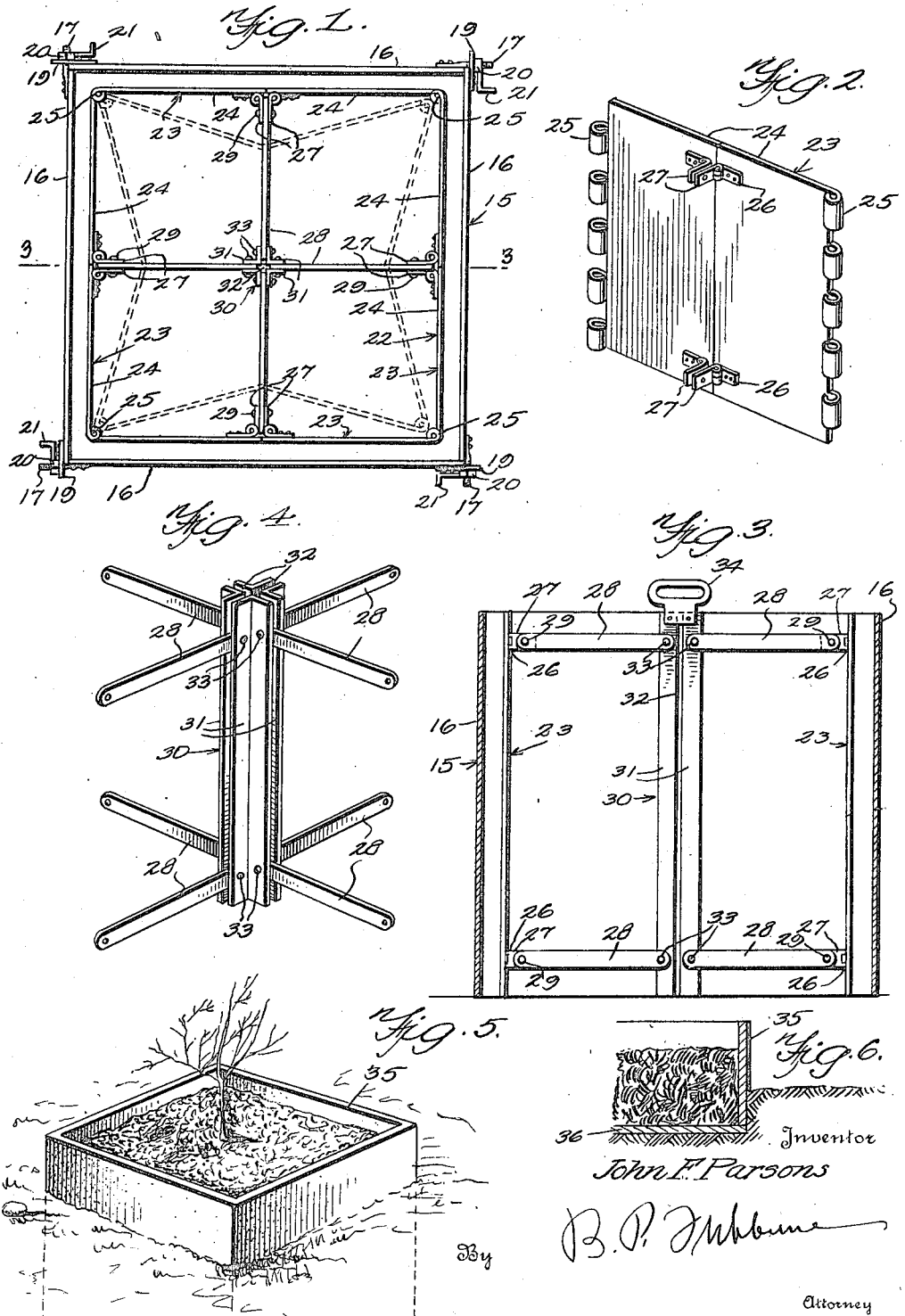

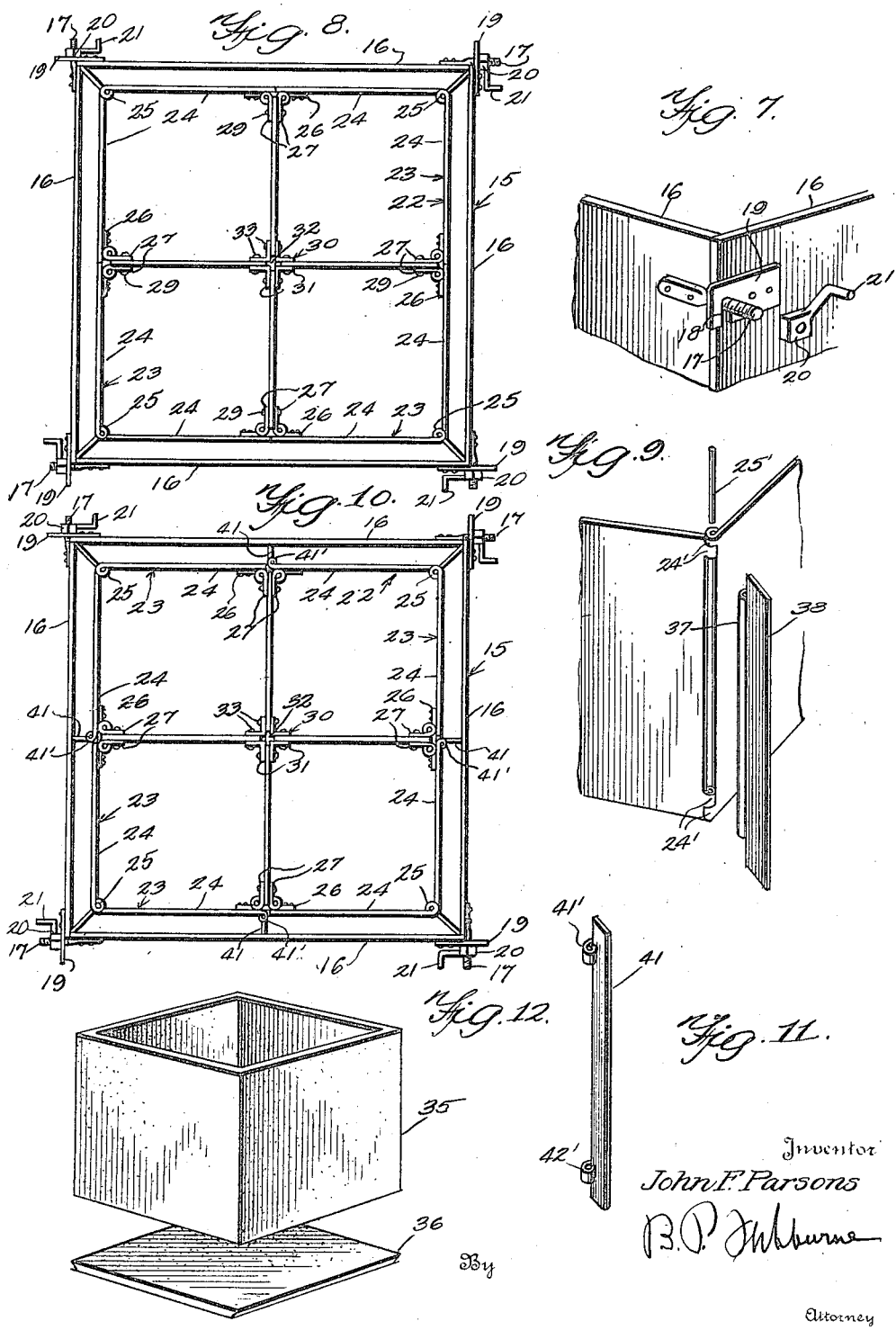

1,458,145

UNITED STATES PATENT OFFICE.

JOHN F. PARSONS, OF PULLMAN, MICHIGAN.

MOLDING APPARATUS.

Application filed December 16, 1921. Serial No. 522,826.

*To all whom it may concern:*

Be it known that I, JOHN F. PARSONS, a citizen of the United States, residing at Pullman, in the county of Allegan and State of Michigan, have invented certan new and useful Improvements in Molding Apparatus, of which the following is a specification.

My invention relates to molding apparatus, for forming cases or boxes from plastic material, which cases are adapted to receive soil, and to the cases produced by such apparatus.

An important object of the invention is to provide apparatus for molding the case with its side or sides integral, and its top and bottom open.

A further object of the invention is to provide molding apparatus for forming the bottom of the case, such apparatus forming a plurality of bottoms at one time.

A further object of the invention is to provide means adapted to cooperate with the bottom forming mold, whereby the mold may produce narrow slabs, employed in forming a retainer about the casing.

Other objects and advantages of the invention will be apparent during the course of the following description.

In the accompanying drawing forming a part of this specification, and in which like numerals are employed to designate like parts throughout the same.

Fig. 1 is a plan view of mold apparatus embodying my invention.

Fig. 2 is a perspective view of one side thereof,

Fig. 3 is a vertical section taken on line 3—3 of Fig. 1,

Fig. 4 is a perspective view of the inner post and associated arms,

Fig. 5 is a perspective view of the mold case, showing a plant therein,

Fig. 6 is a vertical section through a portion of the case,

Fig. 7 is a fragmentary perspective view of the outer casing of the mold apparatus.

Fig. 8 is a plan view of the mold apparatus for producing the bottom,

Fig. 9 is a fragmentary perspective view of the core of this mold apparatus showing a division plate separated therefrom, Fig. 10 is a plan view of the mold apparatus showing intermediate division plates, for forming narrow slabs, Fig. 11 is a perspective view of the intermediate division plate, and, Fig. 12 is a perspective view of the case, with its bottom separated therefrom.

In the drawings, wherein for the purpose of illustration is shown a preferred embodiment of my invention, attention being called to Figs. 1 to 7 inclusive, the numeral 15 designates the outer casing of the mold, including sides 16. I have shown 4 of these sides arranged at a right angle to each other, as the case to be molded is to be rectangular, but of course the number of sides may vary depending uopn the shape of the case to be constructed. Each side 16 may be provided near its top and bottom, and at one end, with screw threaded rods 17, rigidly secured thereto. These rods are adapted to enter notches 18 in catches 19, rigidly secured to the end of the adjacent side 16. A nut 20 engages the bolt 17, and may be turned thereon by a handle 21. It is obvious that other suitable means might be employed to detachably connect the ends of the sides 16.

The sides 16 constitute an outer casing, as above stated, which is preferably square and preferably has a length equal to its width. Arranged within the outer casing is a collapsible core designated as a whole by the numeral 22. This core embodies four sides 23, each side including sections 24. The sections 24 of different sides are hinged together at their outer edges, as shown at 25. At their inner edges, the sections 24 of each side have leaf hinges 26 secured thereto, adjacent their upper and lower ends, and the inner ends 27 receive therebetween vertically swinging arms 28, which are pivoted thereto by bolts 29 or the like.

The arms 28 extend inwardly and are pivotally connected with a post 30, embodying four angle irons 31, assembled in a group to form passages 32, to receive the inner ends of the arms 28, these inner ends being pivoted to the angle irons 31 by bolts 33. A handle or loop 34 is connected with the top of the post 30, and is employed to raise and lower the core 22 and to collapse the same. The core may be raised manually or connected with a hoist and raised by the same, if desired.

In the use of this form of apparatus, the outer casing 15 is first assembled and vertically arranged, upon the ground, or upon a suitable platform or foundation, if desired. The collapsible core 22 is now lowered into the casing 15 and is expanded therein, and assumes a central position within the casing 15. When thus expanded, concrete or other plastic material is fed into the passage between the core and casing, and this concrete is of course allowed to set. After the concrete is sufficiently hard, the post 30 is elevated, which serves to collapse the core 22, whereby the core may be removed. The sides 16 of the casing 15 are now disconnected and the concrete case or box is completed.

This concrete case or box may now be filled with rich earth, or suitably fertilized soil and the plant planted therein. The case or box may be arranged upon the ground or land or may be partly or wholly submerged. In Fig. 5 the case or box 35 is shown partly submerged in the ground.

I also contemplate using the core 22 without the outer casing 15, to form the case. I may dig a suitable hole in the ground, and place the expanded core 22 therein, and pour the concrete in the hole, exteriorly of the core. The core is subsequently removed, and the case remains in the ground.

I have found that in some land, that the case or box 35 may be used satisfactorily without a bottom, while in other land, where the soil is very damp or sandy, it is necessary to provide a concrete bottom 36 for the box.

This bottom is made by the apparatus shown in Figs. 8 to 10 inclusive.

In this apparatus the same outer casing 15 is employed. I also employ the collapsible core 22, which is identical with the core 22, except for certain changes to be now described. In Fig. 9 it will be seen that certain of the knuckles 24', have been cut away, and a knuckle 37 carried by a diagonal division plate 35 substituted therefor. The knuckles 24' and 37 are connected by the rod 25'. It is thus seen that the division plates 38 are diagonally arranged at the corners of the core 22, and divide the passage between the core and the casing 15 into four compartments, which are all filled with concrete, and when the collapsible core 22 is removed the plates 38 are withdrawn and four separate bottoms 36 thus produced. This is regarded as an important feature of the invention.

When using the case 35 for some purposes, such as for planting trees therein, I have found it advantageous to produce a retaining casing about the case 35, to retain additional moisture, and in order that rich soil may be spread upon the surface of the ground between the case 35 and the retainer. This retainer I construct of narrow slabs, which I also can produce by the mold shown in Figs. 8 and 10, by employing division plates 41, which are hinged at 41, to the side section 24, adjacent their inner edges. As shown in Fig. 10, 8 of the narrow slabs may be produced at one time. These slabs will be twice as tall as they are wide, and in use are arranged horizontally on edge.

The case or box 35 being formed of concrete, is highly porous, and the moisture from the surrounding swamp land will pass through this concrete to the interior of the case. When the bottom of the case is used, in very wet land, this is particularly true, but when the bottom is omitted, the moisture also readily passes upwardly through such bottom opening.

It is to be understood that the forms of my invention herewith shown and described, are to be taken as preferred examples of the same, and that various changes in the shape, size, and arrangement of parts may be resorted to without departing from the spirit of my invention or the scope of the subjoined claims.

Having thus described my invention, I claim:

1. In molding apparatus of the character described, an outer casing, a collapsible core adapted to be arranged therein, said core embodying a plurality of sides, each side comprising a pair of sections, the outer ends of the sections of one side being hinged to the outer ends of the section of the adjacent sides, hinged leaves connected with the inner ends of the sections of each side and extending inwardly, a post, and arms pivotally connected with the post to swing vertically and having their outer ends arranged between the inner ends of the leaf hinges and pivotally connected therewith.

2. In molding apparatus of the character described, an outer casing, an inner collapsible core, said core comprising a plurality of sides, each side including a pair of sections, the sections of one side being hinged to the ends of the sections in the adjacent sides, a post arranged within the core, arms connected with the post and hinged to the inner portions of said sections, and division plates arranged at the corners of the core and having a hinged connection therewith.

3. In apparatus of the character described, an outer casing, a collapsible core therein, comprising sides, each side including a pair of sections, said sections being provided at their outer edges with knuckles, the knuckles of the sections of one side cooperate with the knuckles of the section of the adjacent sides, a rod passing through said corporating knuckles to pivotally connect them, division plates arranged at the corners of the core and having knuckles to corporate with the knuckles of said sections and receiving the rods, means pivotally connecting the inner edges of said sections, and means to contract and expand said core.

4. In apparatus of the character described, an outer casing a collapsible core therein including sides hinged at their corners, division plates arranged diagonally at said corners and having pivotal connection with the hinges of the sides, and intermediate division plates hinged to the sides and arranged between the diagonal division plates.

In testimony whereof I affix my signature in presence of two witnesses.

JOHN F. PARSONS.

Witnesses:
C. A. HUTCHINSON,
W. J. ROBBINS.